US012469469B2

(12) United States Patent
Chen et al.

(10) Patent No.: US 12,469,469 B2
(45) Date of Patent: Nov. 11, 2025

(54) COMPOSITE DISPLAY DEVICE AND CONTROLLING METHOD THEREOF

(71) Applicant: Iris Optronics Co., Ltd., Tainan (TW)

(72) Inventors: Chih Wei Chen, Hsinchu County (TW); Chi Chang Liao, Tainan (TW)

(73) Assignee: Iris Optronics Co., Ltd., Tainan (TW)

( * ) Notice: Subject to any disclaimer, the term of this patent is extended or adjusted under 35 U.S.C. 154(b) by 0 days.

(21) Appl. No.: 18/805,569

(22) Filed: Aug. 15, 2024

(65) Prior Publication Data

US 2025/0061866 A1 Feb. 20, 2025

Related U.S. Application Data

(60) Provisional application No. 63/533,498, filed on Aug. 18, 2023.

(51) Int. Cl.
*G09G 5/10* (2006.01)
*G09G 3/20* (2006.01)
(Continued)

(52) U.S. Cl.
CPC ......... *G09G 3/3607* (2013.01); *G09G 3/2096* (2013.01); *G09G 3/32* (2013.01); *G09G 2300/023* (2013.01); *G09G 2320/0233* (2013.01); *G09G 2320/0242* (2013.01); *G09G 2320/041* (2013.01); *G09G 2320/043* (2013.01); *G09G 2320/0666* (2013.01);
(Continued)

(58) Field of Classification Search
CPC ...... G09G 3/3607; G09G 3/2096; G09G 3/32; G09G 2300/023; G09G 2320/0233; G09G 2320/0242; G09G 2320/041; G09G 2320/043; G09G 2320/0666; G09G 2330/021; G09G 2340/12; G09G 2360/04; G09G 2360/144
USPC .......................................................... 345/690
See application file for complete search history.

(56) References Cited

U.S. PATENT DOCUMENTS

2008/0007486 A1 1/2008 Fujinawa et al.
2013/0271445 A1* 10/2013 Park ...................... G02F 1/1347
345/212
(Continued)

FOREIGN PATENT DOCUMENTS

CN 104050930 A 9/2014
CN 106324877 A 1/2017
(Continued)

*Primary Examiner* — Jennifer T Nguyen
(74) *Attorney, Agent, or Firm* — CKC & Partners Co., LLC

(57) ABSTRACT

A composite display device includes a composite display, a brightness acquisition module, an image management module and a panel controlling module. The composite display includes a first display panel and a second display panel. The brightness acquisition module is connected to the composite display and acquires an ambient brightness around the composite display. The image management module is connected to the brightness acquisition module and generates a first image setting signal and a second image setting signal according to the ambient brightness. The panel controlling module is connected to the image management module and the composite display, and respectively controls the first display panel and the second display panel to display a first and second images based on the first and second image setting signals to form a composite image.

16 Claims, 9 Drawing Sheets

(51) Int. Cl.
*G09G 3/32* (2016.01)
*G09G 3/36* (2006.01)

(52) U.S. Cl.
CPC ... *G09G 2330/021* (2013.01); *G09G 2340/12* (2013.01); *G09G 2360/04* (2013.01); *G09G 2360/144* (2013.01)

(56) References Cited

U.S. PATENT DOCUMENTS

| | | | | |
|---|---|---|---|---|
| 2015/0138214 | A1* | 5/2015 | Roh | G09G 3/36 345/1.3 |
| 2016/0232856 | A1 | 8/2016 | Hidaka et al. | |
| 2016/0349868 | A1 | 12/2016 | Kim et al. | |
| 2017/0053603 | A1 | 2/2017 | Hirakata | |
| 2018/0114489 | A1 | 4/2018 | Tan et al. | |
| 2018/0174555 | A1* | 6/2018 | Lee | G09G 5/10 |
| 2019/0027101 | A1 | 1/2019 | Lin et al. | |
| 2022/0358887 | A1 | 11/2022 | Liao et al. | |

FOREIGN PATENT DOCUMENTS

| | | | |
|---|---|---|---|
| CN | 109119037 | A | 1/2019 |
| JP | 2006-350431 | A | 12/2006 |
| JP | 2019-168508 | A | 10/2019 |
| JP | 2020-144391 | A | 9/2020 |
| WO | 2015/045752 | A1 | 4/2015 |
| WO | 2016/181804 | A1 | 11/2016 |

* cited by examiner

COMPOSITE DISPLAY DEVICE AND CONTROLLING METHOD THEREOF

RELATED APPLICATIONS

This application claims priority to U.S. Provisional Application Ser. No. 63/533,498, filed Aug. 18, 2023, which is herein incorporated by reference.

BACKGROUND

Technical Field

The present disclosure relates to a display device and a controlling method thereof. More particularly, the present disclosure relates to a composite display device and a controlling method thereof.

Description of Related Art

With the development of technology and market demands, outdoor displays can be seen everywhere outdoors, but the image quality of the outdoor displays under sunlight still needs to be improved. Current solutions have combated bright ambient light by increasing screen brightness, which not only increases power consumption, but also accumulates heat energy and shortens the lifetime of the outdoor displays.

Among the characteristics of cholesteric liquid crystal display (ChLCD), besides a planar state for controlling the reflectivity of the panel to reflect ambient light to provide an image, there is a focal conic state for allowing the light penetrate the panel. The planar state and the focal conic state are described as bistability because ChLCD can maintain the aforementioned two states without consuming power. If an active light-emitting display is disposed on and combined with the back of ChLCD, a new display can be formed. When the ambient light is sufficient, ChLCD is used as the main display. When the ambient light is insufficient, the active light-emitting display is used as the main display. Therefore, the aforementioned new display can save energy, but it does not take into account the image decay and interference encountered when the two displays display images simultaneously. For example, based on the stacked structure of the two displays, the transmittance of the front display greatly affects the luminous intensity of the rear display, causing the overall image having uneven color so as to affect user's viewing experience. In view of this, how to maintain the color consistency of the images displayed by the two displays has become an urgent problem that related industries want to solve currently.

SUMMARY

According to one aspect of the present disclosure, a composite display device includes a composite display, a brightness acquisition module, an image management module and a panel controlling module. The composite display includes a first display panel and a second display panel. The second display panel is disposed on and aligned with the first display panel. The brightness acquisition module is connected to the composite display and configured to acquire an ambient brightness around the composite display. The image management module is connected to the brightness acquisition module. The image management module generates a first image setting signal corresponding to the first display panel according to the ambient brightness, and generates a second image setting signal corresponding to the second display panel according to the first image setting signal. The panel controlling module is connected to the image management module and the composite display. The panel controlling module controls the first display panel to display a first image based on the first image setting signal, and controls the second display panel to display a second image based on the second image setting signal. The first image overlaps with the second image to form a composite image.

According to another aspect of the present disclosure, a controlling method of a composite display device includes acquiring an ambient brightness around a composite display by a brightness acquisition module, wherein the composite display includes a first display panel and a second display panel; generating a first image setting signal corresponding to the first display panel according to the ambient brightness and a second image setting signal corresponding to the second display panel according to the first image setting signal by an image management module; and controlling the first display panel to display a first image based on the first image setting signal and the second display panel to display a second image based on the second image setting signal by a panel controlling module, wherein the first image overlaps with the second image to form a composite image.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected" to another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
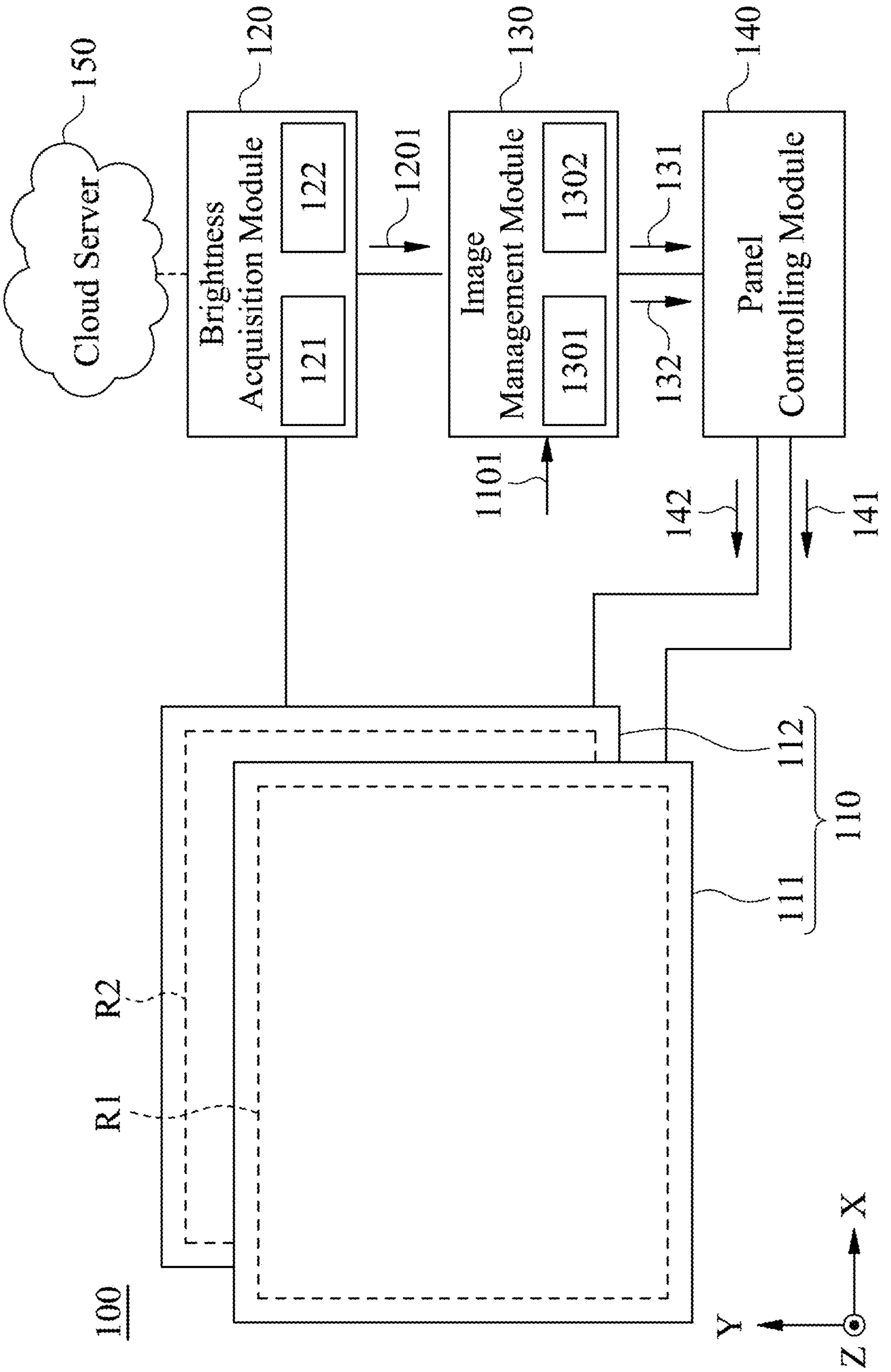
FIG. 1 is a schematic view of a composite display device according to a first embodiment of the present disclosure.
Figure 2:
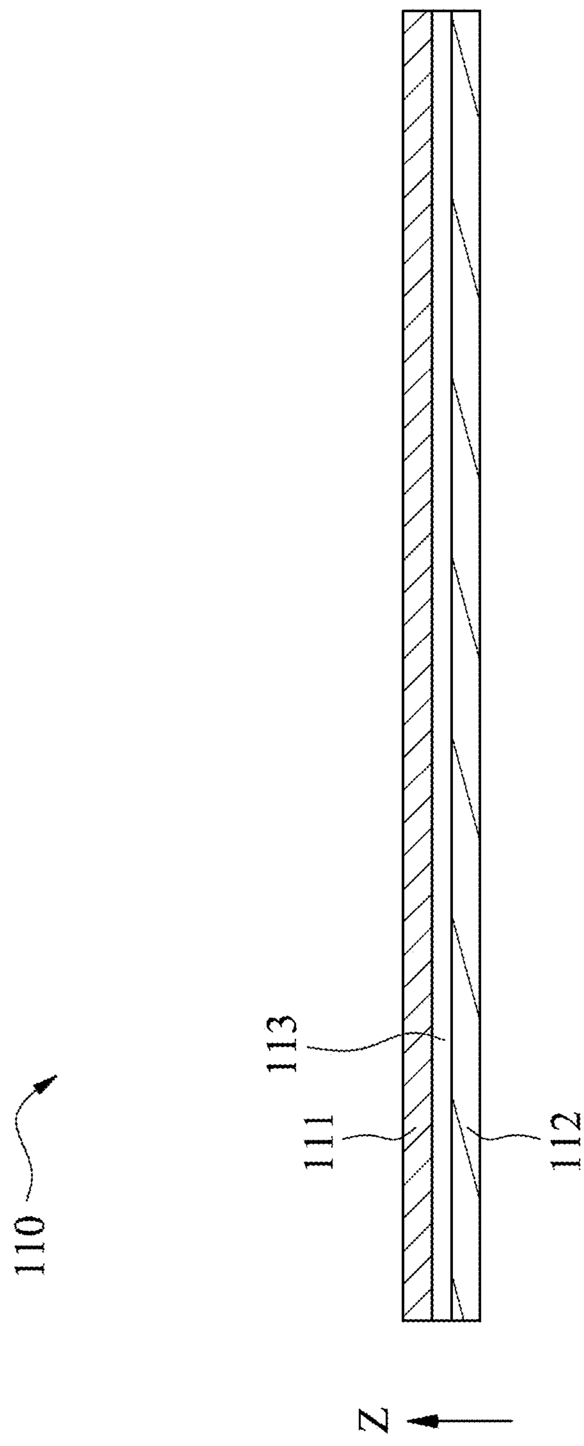
FIG. 2 is a cross-sectional view of a composite display of the present disclosure.
Figure 3:
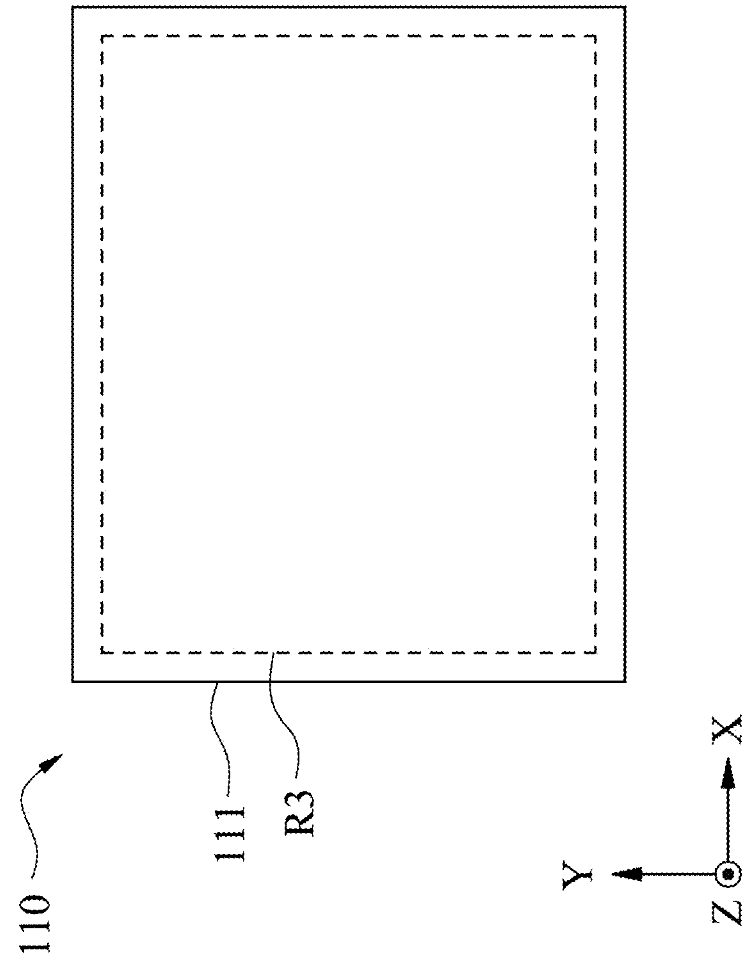
FIG. 3 is a top view of the composite display of the present disclosure.

Please refer to FIGS. 1, 2 and 3. FIG. 1 is a schematic view of a composite display device according to a first embodiment of the present disclosure. FIG. 2 is a cross-sectional view of a composite display of the present disclosure. FIG. 3 is a top view of the composite display of the present disclosure. In order to facilitate the explanation of the structural configuration of each component of a composite display device 100, the composite display 110 in FIG. 1 is shown in an exploded view. As shown in FIG. 1, the composite display device 100 includes a composite display 110, a brightness acquisition module 120, an image management module 130 and a panel controlling module 140.

The composite display 110 includes a first display panel 111 and a second display panel 112. The first display panel 111 is disposed on the front of the second display panel 112 along a stacking direction (i.e., a direction Z), and the second display panel 112 is disposed on and aligned with the rear of the first display panel 111. The brightness acquisition module 120 is electrically connected to the composite display 110 and configured to acquire an ambient brightness 1201 around the composite display 110. The image management module 130 is electrically connected to the brightness acquisition module 120, and receives the ambient brightness 1201 from the brightness acquisition module 120. The image management module 130 generates a first image setting signal 131 corresponding to the first display panel 111 according to the ambient brightness 1201, and generates a second image setting signal 132 corresponding to the second display panel 112 according to the first image setting signal 131. The panel controlling module 140 is electrically connected to the image management module 130 and the composite display 110, and receives the first image setting signal 131 and the second image setting signal 132 from the image management module 130. The panel controlling module 140 feeds a first controlling signal 141 to the first display panel 111 based on the first image setting signal 131, and feeds a second controlling signal 142 to the second display panel 112 based on the second image setting signal 132. The panel controlling module 140 controls the first display panel 111 to display a first image through the first controlling signal 141, and controls the second display panel 112 to display a second image through the second controlling signal 142. Since both the first image and the second image are displayed toward the direction Z, the first image overlaps with the second image to form a composite image. In addition, either the first display panel 111 or the second display panel 112 can also be controlled by the panel controlling module 140 to show individual image alone. Therefore, the composite display device 100 of the present disclosure can drive the first display panel 111 to display the first image, or drive the second display panel 112 to display the second image independently. In addition, the composite display device 100 can also drive the first display panel 111 and the second display panel 112 to display different images (i.e., the first image and the second image) simultaneously. For example, the front and rear panels respectively present static and dynamic images, or 3D effects with different depths of field, so the image overlapping method can be used to create the composite image with multiple visual effects.

As shown in FIG. 2, the composite display 110 can further include an adhesive layer 113. The adhesive layer 113 is disposed between the first display panel 111 and the second display panel 112, so that the first display panel 111 is fixed on the second display panel 112. The material of the adhesive layer 113 can be, but is not limited to, optical clear adhesive (OCA) or other suitable transparent adhesive materials. Since the thickness of the adhesive layer 113 is only between tens to hundreds of microns, it can be ignored. Therefore, the first display panel 111 and the second display panel 112 are closely contacted with each other to avoid interface reflection caused by changes in the refractive index of the air medium, thereby reducing light transmission loss. In other embodiments, the first display panel can be spaced apart from the second display panel. That is, an air medium is disposed between the two panels so as to reduce heat conduction between the two panels and costs.

Specifically, the first display panel 111 can be a transflective display panel, which can be, for example, a cholesteric liquid crystal display panel, such as a display panel in a cholesteric liquid crystal display (ChLCD). The second display panel 112 can be an active light emitting display panel, which can be, for example, a mini light emitting diode (mini LED) display panel, a micro light emitting diode (micro LED) display panel, an organic light emitting diode (OLED) display panel or a perovskite light emitting diode (PeLED) display panel.

As shown in FIGS. 1 and 3, the first display panel 111 has a first visible region R1 for displaying the first image, and the second display panel 112 has a second visible region R2 for displaying the second image. The first visible region R1 is at least partially overlapped with the second visible region R2 to form an overlapping region R3, and an area of the overlapping region R3 can account for more than 80% of an area (i.e., a total panel area) of the first display panel 111. In this embodiment, the first visible region R1 and the second visible region R2 can be two effective pixel regions of the first display panel 111 and the second display panel 112, respectively. The first visible region R1 and the second visible region R2 are completely overlapped with each other, thereby maximizing the overlapping range between the first image and the second image.

In detail, the second display panel 112 can have the second visible region R2 as the effective pixel region and a non-display region (its reference numeral is omitted) surrounding the second visible region R2. The second visible region R2 can include a plurality of pixels respectively arranged in a plurality of rows and a plurality of columns along a direction X and a direction Y, and the direction X, the direction Y and the direction Z are perpendicular to each other. Each of the pixels can include a light-emitting element (such as mini LED, micro LED, OLED or PeLED) and an active element (such as thin-film transistor (TFT)). According to different product requirements, the light-emitting elements of the pixels can include a plurality of light-emitting elements with different colors, or the same color. The plurality of light-emitting elements with different colors can include a plurality of red light-emitting elements, a plurality of green light-emitting elements and a plurality of blue light-emitting elements. The non-display region can be an area between the second visible region R2 and the outer frame of the second display panel 112. The non-display region can be provided with electronic components (such as drive circuits, chips, conductive lines, etc.) for assisting the second visible region R2, but the present disclosure is not limited thereto.

In some embodiments, the composite display device 100 can further include a cloud server 150. The brightness acquisition module 120 can include a sensing sub-module 121 and a remote sub-module 122. The sensing sub-module 121 can be, but is not limited to, a brightness sensor. The sensing sub-module 121 is electrically connected to the composite display 110 and configured to sense a surrounding of the composite display 110 to generate the ambient brightness 1201. The remote sub-module 122 can be, but is not limited to, a wireless communicator. The remote sub-module 122 is signally connected to the cloud server 150 (such as a weather forecast service) through the Internet, and configured to obtain the ambient brightness 1201 from the cloud server 150 according to a position information of the composite display 110. In other embodiments, in order to reduce system costs, the brightness acquisition module only needs to be configured with either the sensing sub-module or the remote sub-module to acquire the ambient brightness.

In some embodiments, the image management module 130 can be, but is not limited to, a timing controller (TCON), and the panel controlling module 140 can be, but is not limited to, a driver integrated circuit (IC). The image management module 130 can include a processor and a memory. The memory stores a reference brightness 1301 and an artificial intelligence (AI) algorithm 1302. The ambient brightness 1201 and the reference brightness 1301 can be brightness values. In other embodiments, the ambient brightness and the reference brightness can also be illuminance values, and the illuminance value can be, but not limited to, 2000 Lux. The AI algorithm 1302 can be, but is not limited to, a deep learning algorithm or a machine learning algorithm. The processor is electrically connected to the memory, and performs two image management functions based on the reference brightness 1301 and the AI algorithm 1302, one of which is image brightness correction, and the other is image content classification.

Regarding the image brightness correction, the image management module 130 generates the first image setting signal 131 according to the ambient brightness 1201, and sets a transmittance of the first display panel 111 through the first image setting signal 131 (that is, adjusting a grayscale value of the first image), wherein the first image setting signal 131 can include a transmission spectrum data. After receiving the first image setting signal 131 fed by the image management module 130, the panel controlling module 140 can use the first controlling signal 141 to modify the transmittance of the first display panel 111. It should be noted that, due to various considerations of materials, manufacturing and structural configuration, the transmittance of the first display panel 111 is not 100% in part of the visible light spectrum, so the transmittance of the first display panel 111 varies at different color spectra. Therefore, the image management module 130 acquires a first transmittance segment corresponding to a red spectrum, a second transmittance segment corresponding to a green spectrum and a third transmittance segment corresponding to a blue spectrum from the transmission spectrum data of the first image setting signal 131. The image management module 130 respectively adjusts a first intensity parameter corresponding to the red spectrum, a second intensity parameter corresponding to the green spectrum and a third intensity parameter corresponding to the blue spectrum in the second image setting signal 132 according to the first transmittance segment, the second transmittance segment and the third transmittance segment. After receiving the second image setting signal 132 fed by the image management module 130, the panel controlling module 140 transmits the second controlling signal 142 to the second display panel 112 based on the second image setting signal 132 to adjust the luminous intensities of the red light-emitting element, the green light-emitting element and the blue light-emitting element, so that the composite image of the composite display 110 can achieve image color consistency.

In some embodiments, the image management module 130 can compare the ambient brightness 1201 with the reference brightness 1301. In response to determine that the ambient brightness 1201 is greater than the reference brightness 1301 (that is, the ambient light is strong), the image management module 130 controls the first display panel 111 at the front to operate in a reflective mode (corresponding to the planar state of ChLCD) by using the first image setting signal 131, and controls the second display panel 112 at the rear to close by using the second image setting signal 132. In the reflective mode, the cholesteric liquid crystal of ChLCD is in the planar state, and the first display panel 111 reflects the ambient light to display the first image. On the contrary, in response to determine that the ambient brightness 1201 is smaller than the reference brightness 1301 (that is, the ambient light is weak), the image management module 130 controls the first display panel 111 at the front to operate in a transmission mode (corresponding to the focal conic state of ChLCD) by using the first image setting signal 131, and controls the second display panel 112 at the rear to open by using the second image setting signal 132. In the transmission mode, the cholesteric liquid crystal is in the focal conic state, so the second image displayed by the second display panel 112 at the rear can penetrate the first display panel 111. It can be seen that, when the ambient light changes, the image management module 130 can timely feed the first image setting signal 131 and the second image setting signal 132 to the panel controlling module 140. The panel controlling module 140 respectively feeds the first controlling signal 141 and the second controlling signal 142 to the first display panel 111 and the second display panel 112 based on the first image setting signal 131 and the second image setting signal 132, thereby switching the composite display 110 to different display modes, which not only provides high image quality, but also achieves energy saving purpose.

Regarding the image content classification, in some embodiments, the image management module 130 obtains an image content data 1101 from an external controller (not shown), and divides the image content data 1101 into a static image data and a dynamic image data. In detail, the AI algorithm 1302 differentiates frame-by-frame before and after changes of the static image data and the dynamic image data, and classifies the image content data 1101 into the static image data and the dynamic image data. Then, the image management module 130 can integrate the static image data into the first image setting signal 131, so that the first image displayed by the first display panel 111 presents a static image. The image management module 130 can integrate the dynamic image data into the second image setting signal 132, so that the second image displayed by the second display panel 112 presents a dynamic image, and the dynamic image is different from the static image.

In some embodiments, the image management module 130 can also be capable of using the AI algorithm 1302 to divide the image content data 1101 into a first depth-of-field image data and a second depth-of-field image data through different depths of field (DOF) in the image content data 1101. Then, the image management module 130 can integrate the first depth-of-field image data into the first image setting signal 131, so that the first image displayed by the first display panel 111 presents a first depth-of-field image. The image management module 130 can integrate the second depth-of-field image data into the second image setting signal 132, so that the second image displayed by the second display panel 112 presents a second depth-of-field image, and the second depth-of-field image is different from the first depth-of-field image. The method for controlling the composite display 110 is described in more detail with the drawings and the embodiments below.

Figure 4:
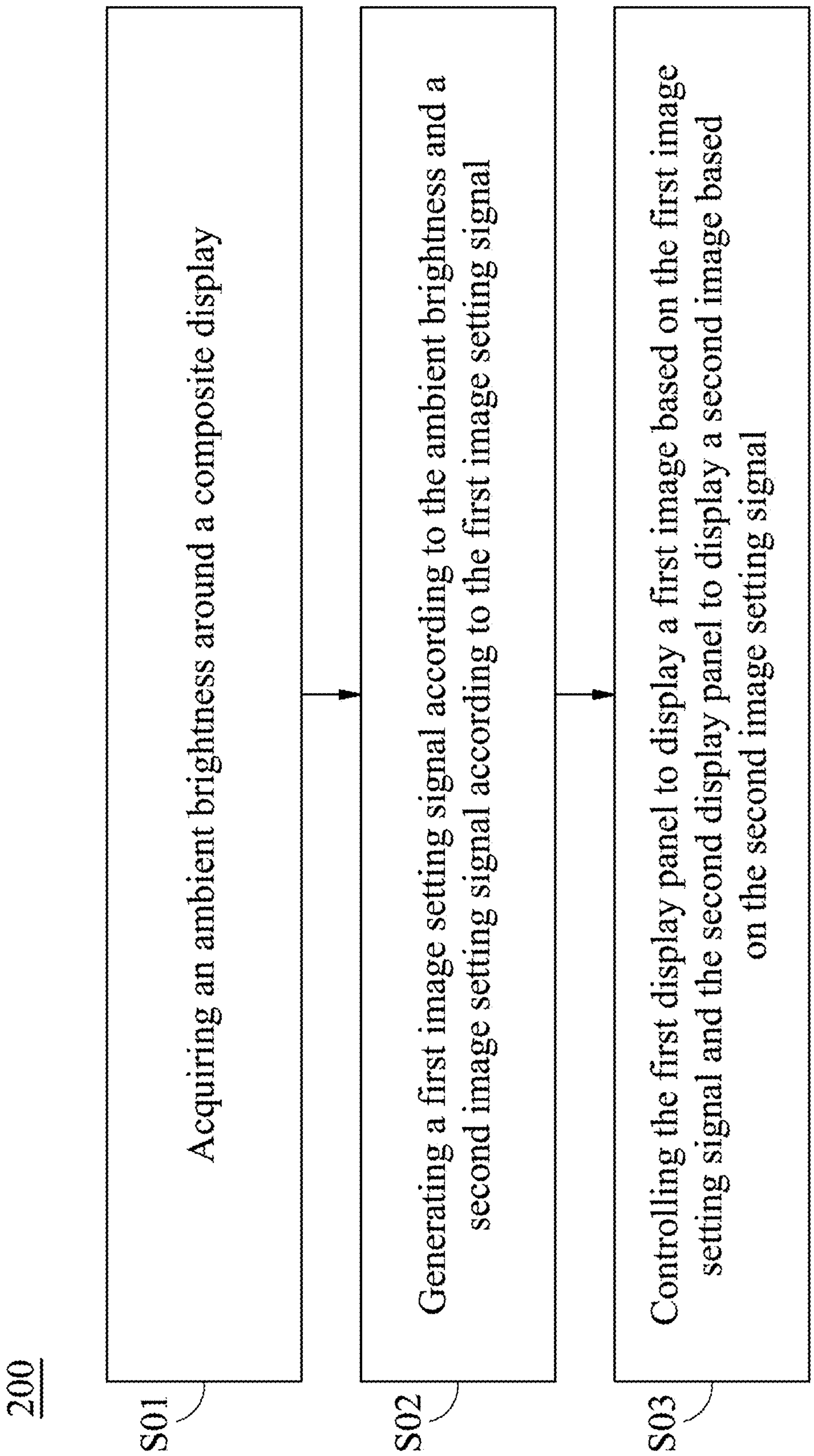
FIG. 4 is a flow chart of a controlling method of a composite display device according to a second embodiment of the present disclosure.
Figure 5:
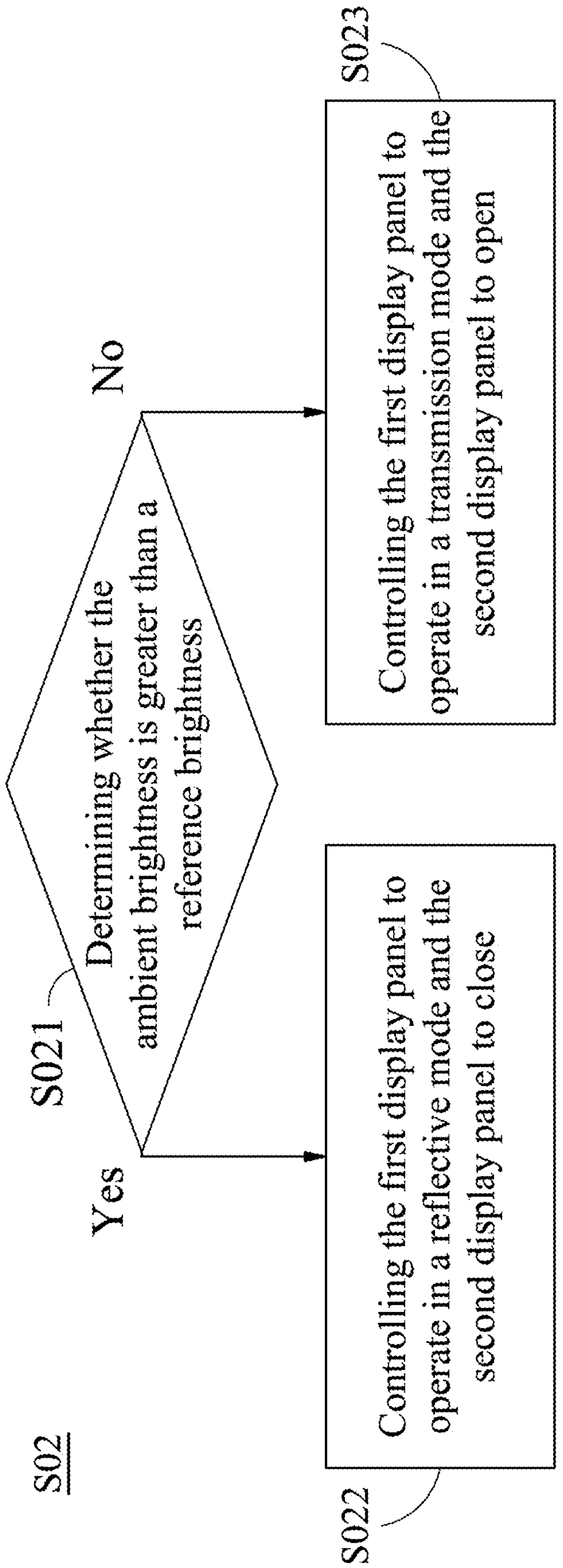
FIG. 5 is a flow chart of a step of generating a first image setting signal and the second image setting signal in the controlling method of the composite display device in FIG. 4.

Please refer to FIGS. 1, 4 and 5. FIG. 4 is a flow chart of a controlling method of a composite display device according to a second embodiment of the present disclosure. FIG. 5 is a flow chart of a step of generating a first image setting signal and the second image setting signal in the controlling method of the composite display device in FIG. 4. As shown in FIGS. 1 and 4, a controlling method 200 can be automatically executed by the composite display device 100, and includes the following Step S01, Step S02 and Step S03.

Step S01: acquiring the ambient brightness 1201 around the composite display 110 by the brightness acquisition module 120.

Step S02: generating the first image setting signal 131 corresponding to the first display panel 111 according to the ambient brightness 1201 and the second image setting signal 132 corresponding to the second display panel 112 according to the first image setting signal 131 by the image management module 130.

Step S03: feeding the first controlling signal 141 to the first display panel 111 based on the first image setting signal 131, and controlling the first display panel 111 to display the first image through the first controlling signal 141 by the panel controlling module 140; and feeding the second controlling signal 142 to the second display panel 112 based on the second image setting signal 132, and controlling the second display panel 112 to display the second image through the second controlling signal 142 by the panel controlling module 140. Therefore, the controlling method 200 of the present disclosure can drive one of the first display panel 111 and the second display panel 112 to display the image independently, or can respectively drive the first display panel 111 and the second display panel to display the first image and the second image at the same time, so that the first image overlapped with the second image can create the composite image with multiple visual effects.

As shown in FIG. 5, Step S02 can further include Step S021, Step S022 and Step S023. Step S021: determining whether the ambient brightness 1201 is greater than the reference brightness 1301 to generate a brightness determination result by the image management module 130. In response to determine that the brightness determination result is Yes, executing Step S022. In Step S022, the panel controlling module 140 controls the first display panel 111 to operate in the reflective mode based on the first image setting signal 131, and controls the second display panel 112 to close based on the second image setting signal 132. On the contrary, in response to determine that the brightness determination result is No, executing Step S023. In Step S023, the panel controlling module 140 controls the first display panel 111 to operate in the transmission mode based on the first image setting signal 131, and controls the second display panel 112 to open based on the second image setting signal 132. Since the first display panel 111 has a bistable state (i.e., the planar state and the focal conic state), and it does not require other backlight sources to improve brightness and display images in the reflective mode. Therefore, the first display panel 111 only consumes electricity when refreshing the screen (i.e., switching the cholesteric liquid crystal state), thereby significantly reducing the overall power consumption of the composite display 110.

Figure 6:
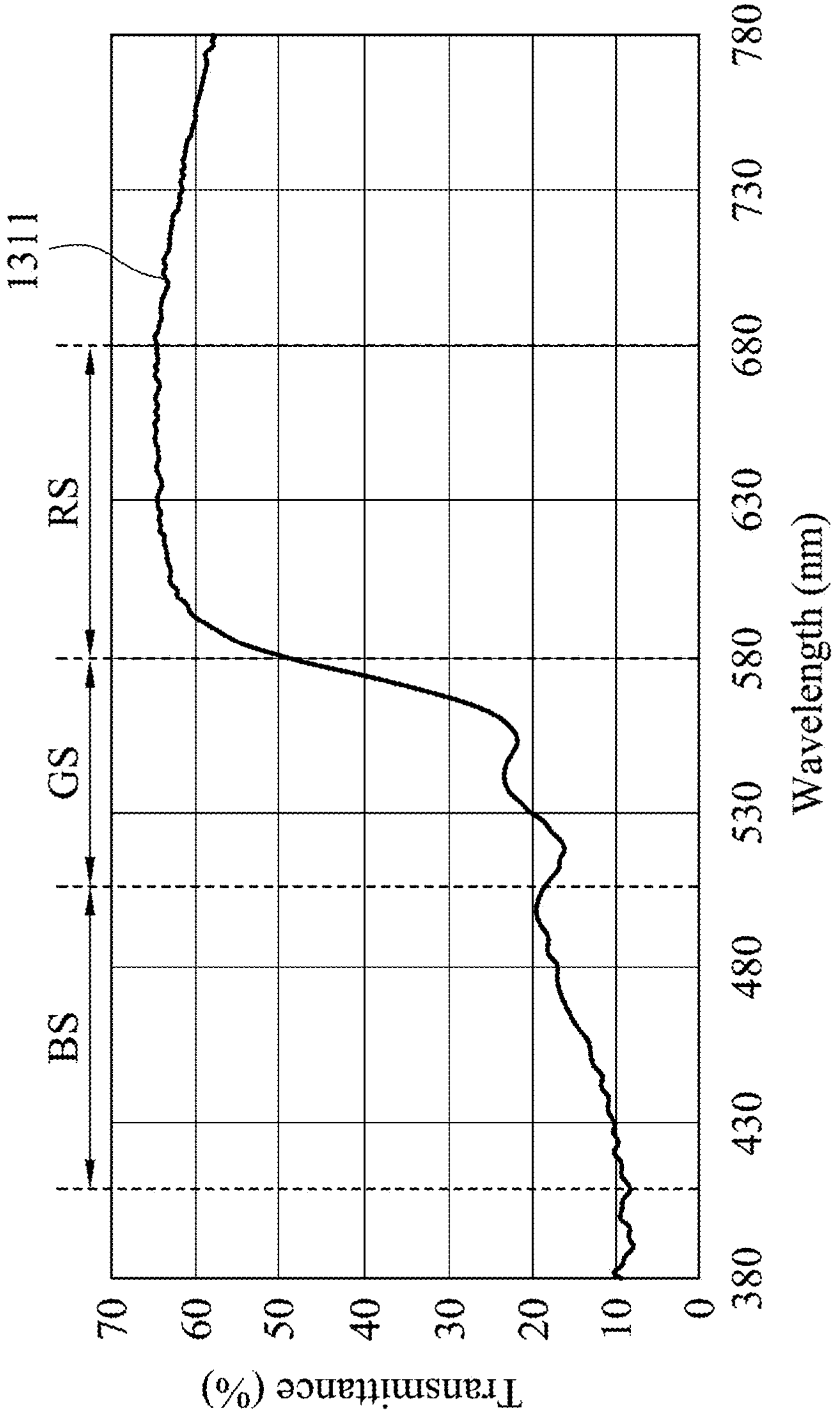
FIG. 6 is a schematic view of a transmission spectrum of a first display panel of the present disclosure.
Figure 7:
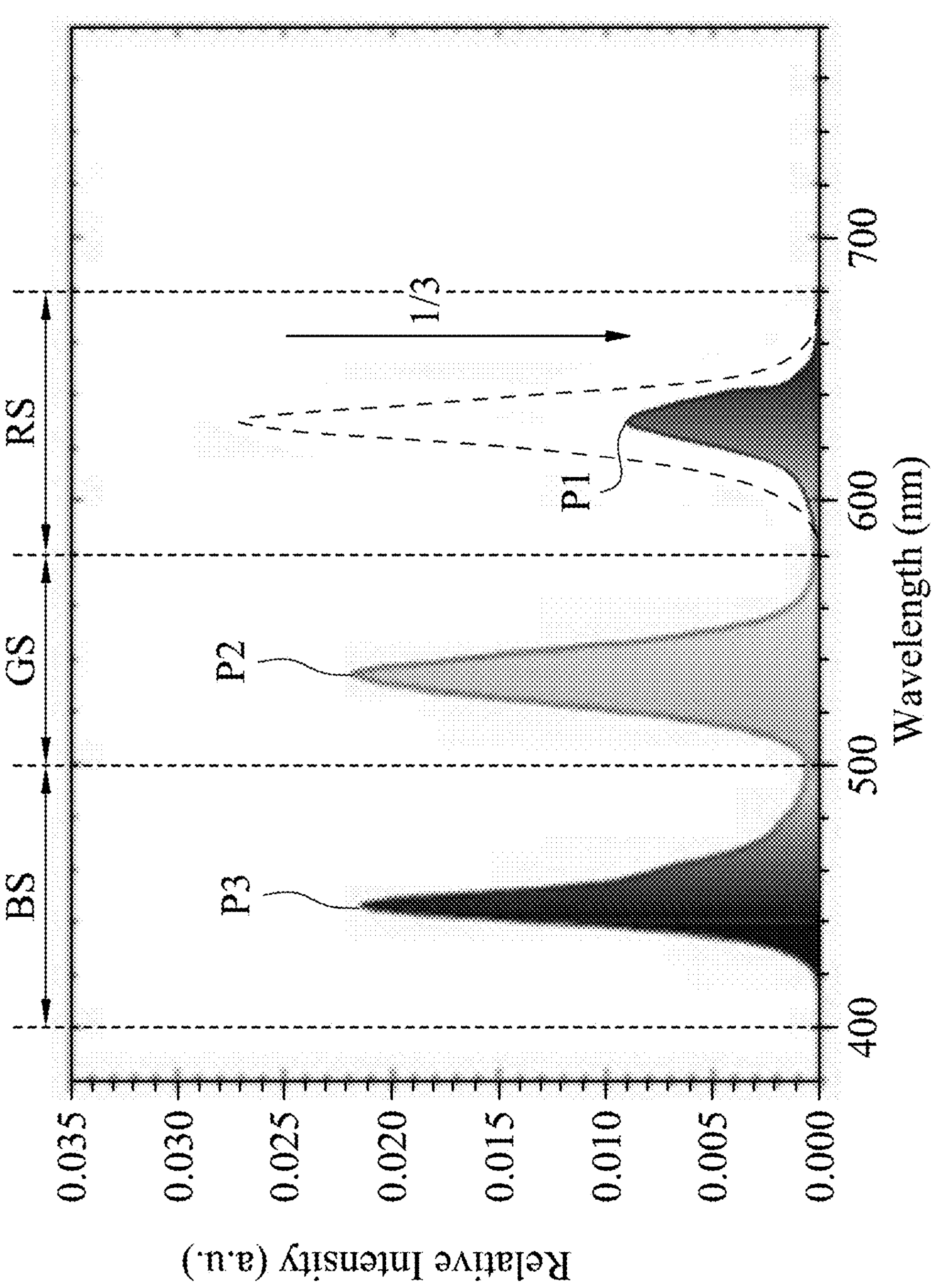
FIG. 7 is a schematic view of spectrum-luminous intensity of a second display panel of the present disclosure.

Please refer to FIGS. 1, 6 and 7. FIG. 6 is a schematic view of a transmission spectrum of a first display panel of the present disclosure. FIG. 7 is a schematic view of spectrum-luminous intensity of a second display panel of the present disclosure. As shown in FIGS. 1, 6 and 7, Step S02 can further include acquiring a first transmittance segment corresponding to a red spectrum RS, a second transmittance segment corresponding to a green spectrum GS and a third transmittance segment corresponding to a blue spectrum BS from a transmission spectrum data 1311 of the first image setting signal 131, and adjusting a first intensity parameter P1 corresponding to the red spectrum RS, a second intensity parameter P2 corresponding to the green spectrum GS and a third intensity parameter P3 corresponding to the blue spectrum BS in the second image setting signal 132 according to the first transmittance segment, the second transmittance segment and the third transmittance segment by the image management module 130.

In detail, when the second display panel 112 displays the second image toward the first display panel 111, the transmittance of the first display panel 111 is not 100%. In some frequency bands of visible light, such as the green spectrum GS (corresponding to the wavelength range 500 nm~580 nm) and the blue spectrum BS (corresponding to the wavelength range 400 nm~500 nm) can exhibit lower transmittance. At this moment, the image management module 130 executes an image brightness correction procedure to correct the brightness of the second image of the second display panel 112. In the image brightness correction procedure, the image management module 130 adjusts the luminous intensities of the second display panel 112 in proportion according to the transmittance changes of the first display panel 111 at different color spectra (i.e., changes in the first transmittance segment, the second transmittance segment and the third transmittance segment). For example, the transmittance of the first display panel 111 at the red spectrum RS (corresponding to the wavelength range 580 nm~680 nm) is greater than the transmittance of the first display panel 111 at the green spectrum GS and the blue spectrum BS by a factor of 3 (as shown in FIG. 6). Therefore, the image management module 130 reduces the value of the first intensity parameter P1 corresponding to the red spectrum RS in the second image setting signal 132, so that the panel controlling module 140 transmits the second controlling signal 142 to the second display panel 112 based on the second image setting signal 132 to reduce the luminous intensity of the red light-emitting element by ⅓, thereby maintaining the color consistency of the image quality.

Figure 8A:
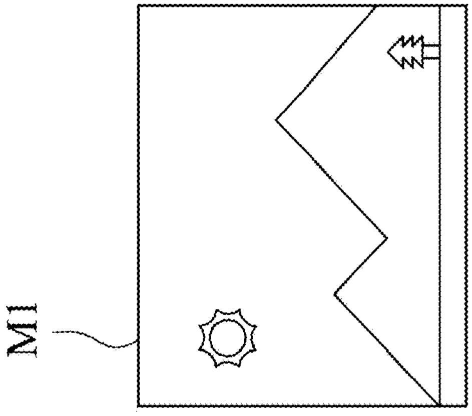
FIG. 8A is a schematic view of a static image of the first display panel of the present disclosure.
Figure 8B:
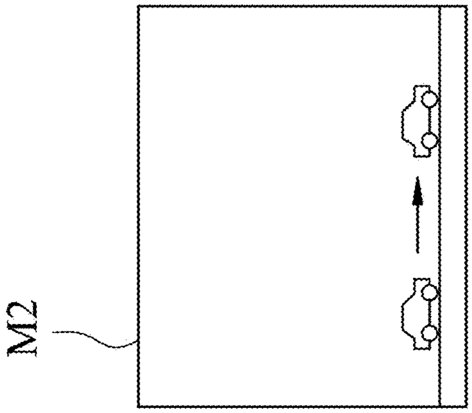
FIG. 8B is a schematic view of a dynamic image of the second display panel of the present disclosure.
Figure 8C:
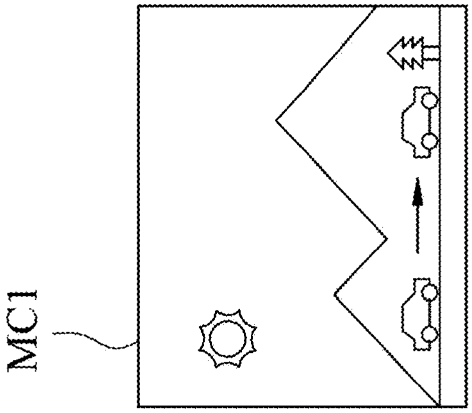
FIG. 8C is a schematic view of a composite image of the composite display of the present disclosure.

Please refer to FIGS. 1, 8A, 8B and 8C. FIG. 8A is a schematic view of a static image of the first display panel of the present disclosure. FIG. 8B is a schematic view of a dynamic image of the second display panel of the present disclosure. FIG. 8C is a schematic view of a composite image of the composite display of the present disclosure. As shown in FIGS. 1, 8A, 8B and 8C, Step S02 can further include obtaining the image content data 1101, and dividing the image content data 1101 into a static image data and a dynamic image data by the image management module 130; integrating the static image data into the first image setting signal 131 by the image management module 130, so that the first image displayed by the first display panel 111 presents a static image M1; and integrating the dynamic image data into the second image setting signal 132 by the image management module 130, so that the second image displayed by the second display panel 112 presents a dynamic image M2, and the dynamic image M2 is different from the static image M1 and overlaps with the static picture M1 to form a composite image MC1. In detail, in order to control the overall power consumption of the composite display 110, the image management module 130 executes an image classification procedure to differentiate the image content to be displayed (i.e., the image content data 1101) into the static image M1 and the dynamic image M2 based on frame-by-frame before and after changes of the static content and the dynamic content. The static image M1 does not need to be updated within a certain period of time, and is displayed by the first display panel 111 at the front. The first display panel 111 does not need to consume power to maintain the static image M1 under bistable characteristics. The content of the dynamic image M2 is different every time when it is updated, the moving content to be changed is restricted to the minimum area, and the dynamic image M2 is displayed by the second display panel 112 at the rear. Thus, when the light source usage is limited, the power consumption and heat can still be reduced, which is equivalent to indirectly the lifetime extension and the operation cost reduction of the composite display 110.

Figure 9C:
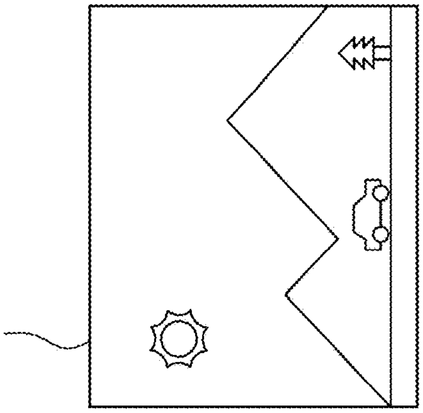
FIG. 9C is a schematic view of a composite image of the composite display of the present disclosure.
Figure 9B:
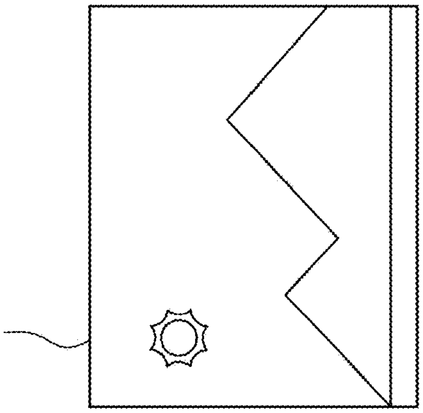
FIG. 9B is a schematic view of a second depth-of-field image of the second display panel of the present disclosure.
Figure 9A:
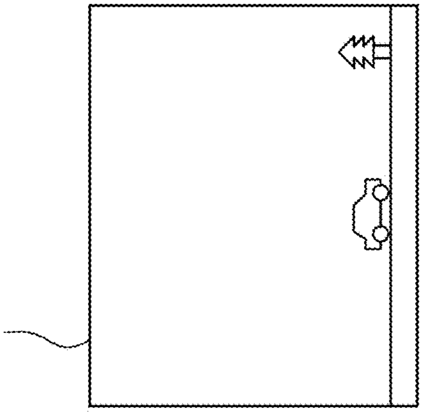
FIG. 9A is a schematic view of a first depth-of-field image of the first display panel of the present disclosure.

Please refer to FIGS. 1, 9A, 9B and 9C. FIG. 9A is a schematic view of a first depth-of-field image of the first display panel of the present disclosure. FIG. 9B is a schematic view of a second depth-of-field image of the second display panel of the present disclosure. FIG. 9C is a schematic view of a composite image of the composite display of the present disclosure. As shown in FIGS. 1, 9A, 9B and 9C, Step S02 can further include obtaining the image content data 1101, and dividing the image content data 1101 into the first depth-of-field image data and the second depth-of-field image data by the image management module 130; integrating the first depth-of-field image data into the first image setting signal 131 by the image management module 130, so that the first image displayed by the first display panel 111 presents a first depth-of-field image M3; and integrating the second depth-of-field image data into the second image setting signal 132 by the image management module 130, so that the second image displayed by the second display panel 112 presents a second depth-of-field image M4, and the second depth-of-field image M4 is different from the first depth-of-field image M3 and overlaps with the first depth-of-field image M3 to form a composite image MC2. In detail, in order to make the composite display 110 present 3D effects from different depths of field, the image management module 130 can differentiate the image content to be displayed (i.e., the image content data 1101) into the first depth-of-field image M3 and the second depth-of-field image M4. The first depth-of-field image M3 can display the main character of the image, while the second depth-of-field image M4 displays side characters. The purpose of depth-of-field classification can emphasize the main character to achieve the effect of attracting attention. In other embodiments, the first display panel can also display the second depth-of-field image, and the second display panel can also display the first depth-of-field image. As for which of the first display panel and the second display panel displays the first depth-of-field image, and another one displays the second depth-of-field image, it depends on the brightness of the external environment and the properties of the image content. Thus, the controlling method 200 of the present disclosure achieves multiple functions of environment sensing, image management and display control through the brightness acquisition module 120, the image management module 130 and the panel controlling module 140, respectively, so that the composite display 110 can create the image with multiple visual effects and the readability of the image is increased.

In summary, the composite display device and the controlling method thereof of the present disclosure have the following advantages. First, the respective characteristics of the first display panel and the second display panel are utilized to achieve image optimization and power saving effects. Second, maintaining the color consistency of the image quality. Third, since the composite display can generate different images on different display panels at the same time, the composite display device can control the composite image to create different effects, such as combining static and dynamic images or creating 3D effects from different depths of field. Fourth, according to the image management, the first display panel at the front and the second display panel at the rear are selected to displayed the images, and they are displayed individually or simultaneously, so the composite display can have multiple display modes.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A composite display device, comprising:

a composite display, comprising:

a first display panel; and a second display panel disposed on and aligned with the first display panel;

a brightness acquisition module connected to the composite display and configured to acquire an ambient brightness around the composite display;

an image management module connected to the brightness acquisition module, wherein the image management module generates a first image setting signal corresponding to the first display panel according to the ambient brightness, and generates a second image setting signal corresponding to the second display panel according to the first image setting signal; and a panel controlling module connected to the image management module and the composite display, wherein the panel controlling module controls the first display panel to display a first image based on the first image setting signal, and controls the second display panel to display a second image based on the second image setting signal;

wherein the first image overlaps with the second image to form a composite image;

wherein the first image setting signal comprises a transmission spectrum data, the image management module acquires a first transmittance segment corresponding to a red spectrum, a second transmittance segment corresponding to a green spectrum and a third transmittance segment corresponding to a blue spectrum from the transmission spectrum data, and the image management module respectively adjusts a first intensity parameter corresponding to the red spectrum, a second intensity parameter corresponding to the green spectrum and a third intensity parameter corresponding to the blue spectrum in the second image setting signal according to the first transmittance segment, the second transmittance segment and the third transmittance segment.

2. The composite display device of claim 1, wherein the brightness acquisition module comprises a sensing sub-module, and the sensing sub-module is configured to sense a surrounding of the composite display to generate the ambient brightness.

3. The composite display device of claim 1, wherein the brightness acquisition module comprises a remote sub-module, and the remote sub-module is signally connected to a cloud server and configured to obtain the ambient brightness from the cloud server according to a position information of the composite display.

4. The composite display device of claim 1, wherein the image management module determines whether the ambient brightness is greater than a reference brightness to generate a brightness determination result;

wherein in response to determine that the brightness determination result is yes, the panel controlling module controls the first display panel to operate in a reflective mode based on the first image setting signal, and controls the second display panel to close based on the second image setting signal;

wherein in response to determine that the brightness determination result is no, the panel controlling module controls the first display panel to operate in a transmission mode based on the first image setting signal, and controls the second display panel to open based on the second image setting signal.

5. The composite display device of claim 1, wherein the image management module obtains an image content data and divides the image content data into a static image data and a dynamic image data;

the image management module integrates the static image data into the first image setting signal, so that the first image displayed by the first display panel presents a static image; and the image management module integrates the dynamic image data into the second image setting signal, so that the second image displayed by the second display panel presents a dynamic image, and the dynamic image is different from the static image.

6. The composite display device of claim 1, wherein the image management module obtains an image content data and divides the image content data into a first depth-of-field image data and a second depth-of-field image data;

the image management module integrates the first depth-of-field image data into the first image setting signal, so that the first image displayed by the first display panel presents a first depth-of-field image; and the image management module integrates the second depth-of-field image data into the second image setting signal, so that the second image displayed by the second display panel presents a second depth-of-field image, and the second depth-of-field image is different from the first depth-of-field image.

7. The composite display device of claim 1, wherein the composite display further comprises:

an adhesive layer disposed between the first display panel and the second display panel.

8. The composite display device of claim 1, wherein the first display panel has a first visible region for displaying the first image, the second display panel has a second visible region for displaying the second image, the first visible region is at least partially overlapped with the second visible region to form an overlapping region, and an area of the overlapping region accounts for more than 80% of an area of the first display panel.

9. The composite display device of claim 1, wherein the first display panel is a cholesteric liquid crystal display panel.

10. The composite display device of claim 1, wherein the second display panel is a mini light emitting diode (mini LED) display panel, a micro light emitting diode (micro LED) display panel, an organic light emitting diode (OLED) display panel or a perovskite light emitting diode (PeLED) display panel.

11. A controlling method of a composite display device, comprising:

acquiring an ambient brightness around a composite display by a brightness acquisition module, wherein the composite display comprises a first display panel and a second display panel;

generating a first image setting signal corresponding to the first display panel according to the ambient brightness and a second image setting signal corresponding to the second display panel according to the first image setting signal by an image management module; and controlling the first display panel to display a first image based on the first image setting signal and the second display panel to display a second image based on the second image setting signal by a panel controlling module;

wherein the first image overlaps with the second image to form a composite image;

wherein the first image setting signal comprises a transmission spectrum data, and generating the first image setting signal corresponding to the first display panel according to the ambient brightness and the second image setting signal corresponding to the second display panel according to the first image setting signal by the image management module comprises:

acquiring a first transmittance segment corresponding to a red spectrum, a second transmittance segment corresponding to a green spectrum and a third transmittance segment corresponding to a blue spectrum from the transmission spectrum data, and adjusting a first intensity parameter corresponding to the red spectrum, a second intensity parameter corresponding to the green spectrum and a third intensity parameter corresponding to the blue spectrum in the second image setting signal according to the first transmittance segment, the second transmittance segment and the third transmittance segment by the image management module.

12. The controlling method of the composite display device of claim 11, wherein the brightness acquisition module comprises a sensing sub-module, and the sensing sub-module is configured to sense a surrounding of the composite display to generate the ambient brightness.

13. The controlling method of the composite display device of claim 11, wherein the brightness acquisition module comprises a remote sub-module, and the remote sub-module is signally connected to a cloud server and configured to obtain the ambient brightness from the cloud server according to a position information of the composite display.

14. The controlling method of the composite display device of claim 11, wherein generating the first image setting signal corresponding to the first display panel according to the ambient brightness and the second image setting signal corresponding to the second display panel according to the first image setting signal by the image management module comprises:

determining whether the ambient brightness is greater than a reference brightness to generate a brightness determination result by the image management module;

wherein in response to determine that the brightness determination result is yes, the panel controlling module controls the first display panel to operate in a reflective mode based on the first image setting signal, and controls the second display panel to close based on the second image setting signal;

wherein in response to determine that the brightness determination result is no, the panel controlling module controls the first display panel to operate in a transmission mode based on the first image setting signal, and controls the second display panel to open based on the second image setting signal.

15. The controlling method of the composite display device of claim 11, wherein generating the first image setting signal corresponding to the first display panel according to the ambient brightness and the second image setting signal corresponding to the second display panel according to the first image setting signal by the image management module comprises:

obtaining an image content data, and dividing the image content data into a static image data and a dynamic image data by the image management module;

integrating the static image data into the first image setting signal by the image management module, so that the first image displayed by the first display panel presents a static image; and integrating the dynamic image data into the second image setting signal by the image management module, so that the second image displayed by the second display panel presents a dynamic image, and the dynamic image is different from the static image.

16. The controlling method of the composite display device of claim 11, wherein generating the first image setting signal corresponding to the first display panel according to the ambient brightness and the second image setting signal corresponding to the second display panel according to the first image setting signal by the image management module comprises:

obtaining an image content data, and dividing the image content data into a first depth-of-field image data and a second depth-of-field image data by the image management module;

integrating the first depth-of-field image data into the first image setting signal by the image management module, so that the first image displayed by the first display panel presents a first depth-of-field image; and integrating the second depth-of-field image data into the second image setting signal by the image management module, so that the second image displayed by the second display panel presents a second depth-of-field image, and the second depth-of-field image is different from the first depth-of-field image.

* * * * *